Dec. 26, 1950 J. V. ATANASOFF ET AL 2,535,029
METHOD AND APPARATUS FOR CUTTING FUSIBLE FABRICS
Filed Aug. 13, 1946 2 Sheets-Sheet 1
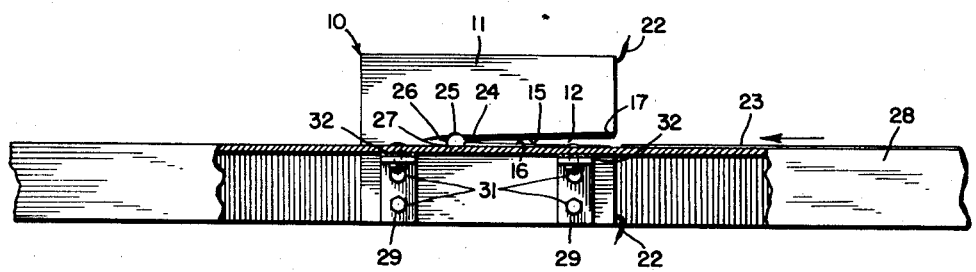
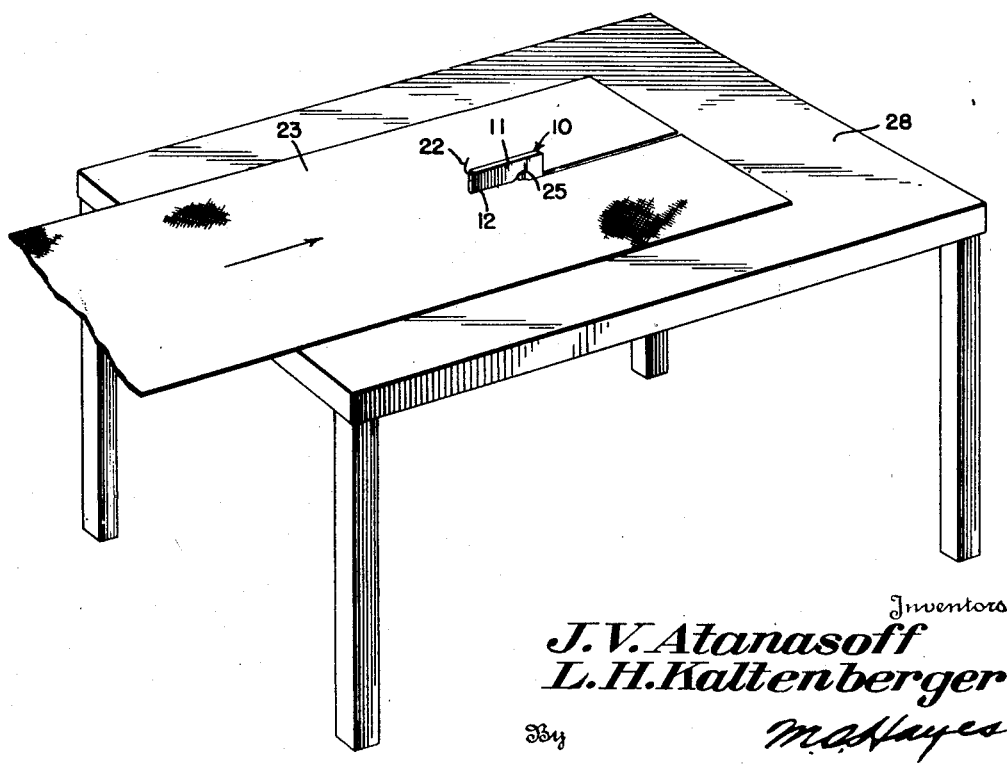
Inventors
J. V. Atanasoff
L. H. Kaltenberger

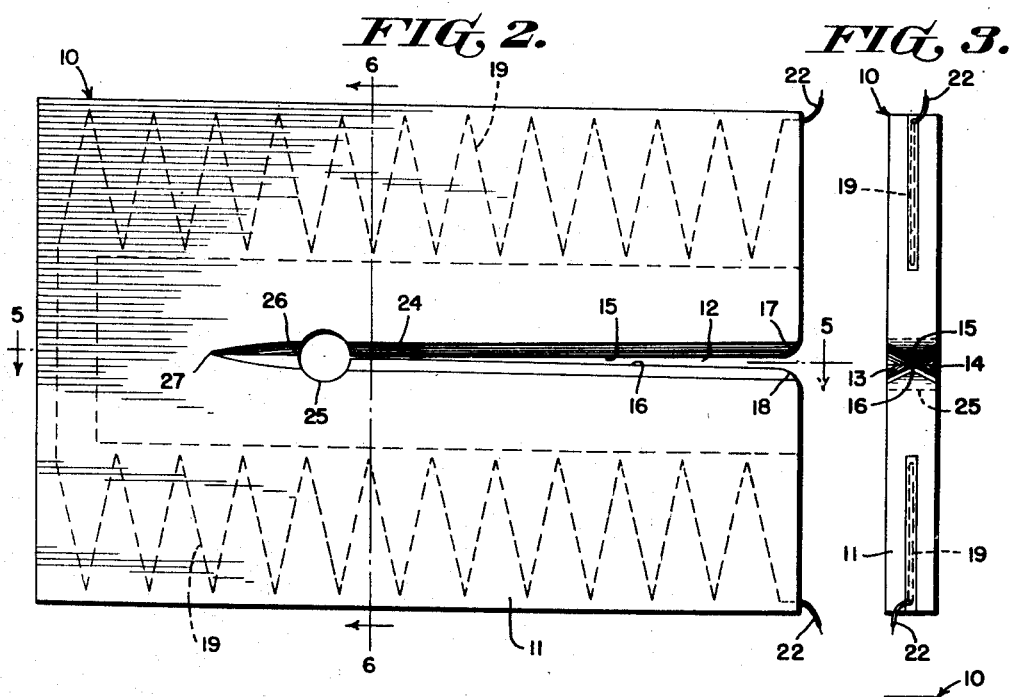

Patented Dec. 26, 1950

2,535,029

UNITED STATES PATENT OFFICE 2,535,029

METHOD AND APPARATUS FOR CUTTING FUSIBLE FABRICS

John V. Atanasoff, Silver Spring, Md., and Lloyd H. Kaltenberger, Wichita Falls, Tex.

Application August 13, 1946, Serial No. 690,201

6 Claims. (Cl. 164—36)

(Granted under the act of March 3, 1883, as amended April 30, 1928; 370 O. G. 757)

This invention relates to a method and apparatus for cutting fusible fabrics. More specifically, the invention relates to a device which is adapted to cut fusible fabrics such, for example, as nylon by melting and concurrently therewith shearing the material of which the fabric is composed and is also adapted to fuse the ends of the parted fibers to form smooth, well-bound and ravel-free edges to the cut material.

In devices heretofore known by us for cutting fusible fabrics, shearing means solely have been employed for performing the cutting operation. In the present invention, however, a combination of melting and shearing is employed to cut the fusible fabric rapidly and additional benefits are derived therefrom in the form of fused edges of the fabrics.

One of the objects of the present invention is to provide a new and improved cutting device of simple, rugged construction which will cut fusible fabrics efficiently and rapidly.

Another of the objects is to provide a method and apparatus for cutting fusible fabrics in a manner so as to produce smooth, well-bound and ravel-free edges to the cut material.

Another of the objects is to provide a tool for cutting fusible fabrics which will not require repeated sharpening as the result of continued use.

Still other objects, advantages and improvements will be apparent from a consideration of the following description, taken in connection with the accompanying drawings, in which:

Fig. 1 is a view of the cutting tool mounted in accordance with a preferred arrangement of the apparatus of the present invention and illustrating the method of employing the apparatus to cut fusible fabrics;

Fig. 2 is a view in elevation of the cutting tool;

Fig. 3 is an end view of the cutting tool of Fig. 2;

Fig. 4 is a view in perspective of the tool in operation; and

Figs. 5 and 6 are sectional views taken respectively along the lines 5—5 and 6—6 of Fig. 2.

Referring now to the drawing in which like numerals of reference are employed to designate like parts throughout the several views, there is shown thereon a cutting apparatus according to the preferred embodiment of the invention, and adapted to cut fusible fabrics such, for example, as nylon in accordance with the method of the invention, the apparatus comprising a cutting tool generally indicated by the numeral 10 which is formed of a plate 11 composed of a suitable heat conducting material such, for example, as metal with a graduated opening 12 therein. The opening 12 is formed by two intersecting V-shaped grooves, 13 and 14, machined in opposite sides of the plate 11 by cutters whose axes are in the same plane; the result being the formation of two non-parallel knife edges, 15 and 16, in the same plane. As the material 23 to be severed is fed, by either manual or mechanical means, into the graduated opening 12, the entrance of which is preferably rounded as at 17 and 18 to facilitate entry of the material 23 along some predetermined line of separation, the material is compressed by the knife edges 15 and 16.

Concurrently therewith the material is heated by contact with the knife edges to a temperature sufficiently high to render it plastic. This heating is accomplished by an electrical heating element 19 provided within a slot formed to a suitable depth in three edges of the perimeter of the plate substantially as shown, the heating element being provided with a pair of electrical conductors 22 for establishing a circuit connection between the heating element and a source of electrical power. The element heats the metal of the plate sufficiently to melt and fuse any fusible fabric material coming into contact with the metal. The compressing and heating operations continue until the material reaches the narrowest point 24 of the opening. At this point, in order to prevent any piling up of the plastic material and to eliminate sticking due to a further narrowing of the opening, a hole 25 is formed through the plate.

The material is continually fed, passing through the hole 25 and reaching an edge 26 formed at a point where the opening 12, because of the intersection of the knife edges 13 and 16, no longer exists and where the V slots 13 and 14 begin to decrease in depth. The depth and width of the V slots decrease until a point 27 is reached where both the depth and width of the slot are zero. The material now is melted into a plastic state and is fed against the aforementioned edge 26 which has the effect of a wedge and forces the softened material to separate and causes each of the separated portions thereof to pass to either side of the plate 11. The severed fibers of the edges of the material 23 are then rubbed against the metal of the diminishing V slots 13 and 14 in the plate 11. The fabric fibers are drawn together by a smearing action, and being in a plastic state, become fused to each other thereby furnishing the cut material 23 with the desired smooth, well-bound and ravel-free edges along the line of separation and eliminating any possibility of snagging loose threads during a cutting operation thereafter involving the fused edges.

As shown in Figs. 1 and 4 the cutting tool 10 may be attached to a table 28 or any other suitable means of support according to the requirements of a specific cutting operation. In the illustrated example, the tool 10 is joined to the table by means of the supporting brackets 29 held in place by any suitable means such as by bolts 31 and is heat insulated from the table by means of the heat insulating spacers 32. For best operation of the cutter, the center line of the opening 12 in the plate 11 lies in the plane of the upper surface of the table 28 or slightly above the surface. It is apparent that provisions for feeding the material at a uniform rate either manually or mechanically may be devised according to the type and amount of material being separated and to the desired result of the cutting operation and that in some instances provision for a movable tool may be utilized as being more practicable in a specific operation without altering the basic characteristics of the invention herein disclosed.

While the invention has been described in particularity with reference to an example thereof which gives satisfactory results, it is to be understood that this has been done for purposes of disclosure and that various other changes and modifications may be readily apparent to those skilled in the art to which the invention pertains, after understanding the invention, and that the terms employed in the appended claims are to be considered as words of description rather than as words of limitation.

The invention herein described and claimed may be manufactured and used by or for the Government of the United States of America for governmental purposes without payment of any royalties thereon or therefor.

What is claimed as new and desired to be secured by Letters Patent of the United States is:

1. An apparatus of the character disclosed for separating fusible fabrics by heat and pressure and comprising a heat conducting plate having a slot therein, a heating element disposed in said slot for heating the plate, a pair of knife edges arranged in the same plane and formed in said plate in predetermined spaced relation in such a manner as to form an elongated tapered opening therebetween, said plate having an enlarged opening formed therein in communication with and abutting said tapered opening at a point where the separation of the knife edges is a minimum, and a wedge in said plate having the apex edge thereof arranged in the plane of said knife edges.

2. An apparatus of the character disclosed for providing smooth, well-bound and ravel-free edges to a fusible fabric material and comprising a heat conducting plate member having a slot and two complementary V-shaped grooves formed therein, said grooves being arranged in corresponding locations on opposite sides of said plate member, each of said grooves decreasing in depth and width from a predetermined maximum at the point where the material enters the groove to a point where the material breaks contact with the plate at the surfaces of the two sides thereof, and a heating element disposed in said slot for heating the plate member and said material.

3. An apparatus of the character disclosed for separating a fusible fabric material and for providing smooth, well-bound and ravel-free parted edges thereto and comprising a heat conducting metal plate, a heating element cooperatively associated with said plate, two complementary knife edges formed in said plate in the same plane and arranged in such a manner as to form an elongated tapered opening, the plate having an enlarged opening formed therein at a point where the graduated opening formed by the knife edges reaches a minimum, a wedge formed in the plate, said wedge having its apex edge arranged in the plane of the knife edges, and two V-shaped grooves formed on opposite sides respectively of the plate, said grooves uniformly decreasing in depth and width from a maximum at the point where the material enters the groove to a point where the material breaks contact with the plate at the opposite sides thereof.

4. A method of separating a fusible fabric along a predetermined line of demarcation so as to produce smooth, well-bound and ravel-free edges therealong which comprises, applying heat and pressure on both sides of the fabric increasingly along the line of demarcation sufficiently to melt and separate the fibers of the fabric, and concurrently therewith smearing the melted and parted fiber ends into the severed edges of the fabric sufficiently to cause the fiber ends to be fused together.

5. The method of separating a fusible fabric material comprising the steps of simultaneously and progressively applying heat and pressure exteriorly to both sides of said fabric along a line of desired separation to render it plastic, separating said fabric while in the plastic state, and wiping the parted edges of said fabric while in the plastic state to render said edges smooth, well-bound and ravel-free.

6. Apparatus for separating a fusible fabric material and for providing smooth, well-bound and ravel-free parted edges thereto comprising a heat conducting metal plate, an element operatively connected to said plate for heating the plate, said plate having an elongated tapered slot therein and having its widest portion at the receiving mouth thereof, knife edges formed on said plate along the length of said slot, said fabric being adapted to enter said receiving mouth and to pass between said knife edges, said tapered slot applying increasing pressure and heat to the top and bottom surfaces of the fabric as the fabric moves along the length of the slot whereby the fabric immediately adjacent the knife edges becomes plastic as it nears the end of the slot in the narrowest portion thereof, and a tapered side wedge adjacent said end of the slot and having its edge in the path of the plastic portion of said fabric for separation thereof, the tapered sides of said wedge having wiping contact with the separated edges of the fabric thereby to fuse the edges of the fabric individual thereto.

JOHN V. ATANASOFF.
LLOYD H. KALTENBERGER.

REFERENCES CITED

The following references are of record in the file of this patent:

UNITED STATES PATENTS

| Number | Name | Date |
|---|---|---|
| 1,445,992 | Cameron | Feb. 20, 1923 |
| 2,035,138 | Maxfield | Mar. 24, 1936 |

FOREIGN PATENTS

| Number | Country | Date |
|---|---|---|
| 690,201 | Germany | Jan. 7, 1936 |